(12) United States Patent
Wang et al.

(10) Patent No.: US 8,793,202 B2
(45) Date of Patent: Jul. 29, 2014

(54) RESTORATION SWITCHING ANALYSIS WITH GENETIC ALGORITHM

(75) Inventors: Zhenyuan Wang, Cary, NC (US); Wenping Li, Fulshear, TX (US)

(73) Assignee: ABB Research Ltd., Zurich (CH)

( * ) Notice: Subject to any disclaimer, the term of this patent is extended or adjusted under 35 U.S.C. 154(b) by 144 days.

(21) Appl. No.: 13/510,301

(22) PCT Filed: Dec. 3, 2010

(86) PCT No.: PCT/US2010/058881
§ 371 (c)(1),
(2), (4) Date: May 17, 2012

(87) PCT Pub. No.: WO2011/069061
PCT Pub. Date: Jun. 9, 2011

(65) Prior Publication Data
US 2012/0239601 A1    Sep. 20, 2012

Related U.S. Application Data

(60) Provisional application No. 61/266,691, filed on Dec. 4, 2009.

(51) Int. Cl.
*G06F 15/18*    (2006.01)
*G06N 3/00*    (2006.01)
*G06N 3/12*    (2006.01)

(52) U.S. Cl.
USPC .......................................................... 706/13

(58) Field of Classification Search
CPC combination set(s) only.
See application file for complete search history.

(56) References Cited

U.S. PATENT DOCUMENTS 7,979,222 B2 *  7/2011  Donde et al. .................... 702/61
8,666,558 B2 *  3/2014  Wang et al. .................... 700/286

FOREIGN PATENT DOCUMENTS

WO    2009076410    6/2009
WO    2011068989    6/2011

OTHER PUBLICATIONS

U.S. Appl. No. 13/512,475.
F. Postiglione, Reply to Communication pursuant to Rules 161 (1) and 162 EPC in corresponding European Application No. 10793093.5 May 22, 2013.
Henriette Huysing-Solles, International Searching Authority (EPO), International Search Report and Written Opinion of the International Searching Authority for corresponding International Application No. PCT/US2010/058881, European Patent Office, mailed Feb. 16, 2011.
Zhang Dong, Fu Zhengcai, Zhang Liuchun and Song Zhengqiang, "Network Reconfiguration in Distribution Systems Using a Modified TS Algorithm," Proceedings of the 7th WSEAS International Conference on Mathematical Methods and Computational Techniques in Electrical Engineering, pp. 310-314, Oct. 27, 2005.

(Continued)

*Primary Examiner* — Michael B Holmes
(74) *Attorney, Agent, or Firm* — Steven W. Hudnut; Michael C. Prewitt

(57) ABSTRACT

A method for generating switching plans to restore power to out-of-service areas after fault isolation through back feeding. A chromosome architecture is defined to create chromosomes representing candidate post-restoration systems. The chromosomes are evaluated are repeatedly genetically altered until an acceptable solution is identified. The solution identifies a plurality of switching operations that back feed power to the out-of-service areas in the most optimal manner.

24 Claims, 9 Drawing Sheets

(56) References Cited

OTHER PUBLICATIONS

Ning Xiong, Haozhong Cheng, Liangzhong Yao and Masoud Bazargan, "Switch Group Based Tabu Search Algorithm for Distribution Network Reconfiguration," Proceedings of the 3rd International Conference on Electric Utility Deregulation and Restructuring and Power Technologies, (DRPT '08), pp. 820-822, Apr. 6, 2008, Nanjing China.

Fred Glover and Manuel Laguna, "Tabu Search," Handbook of Combinatorial Optimization, vol. 3, pp. 621-757, Kluwer Academic Publishers, 1998.

Xiuxia Yang and Yi Zhang, "Intelligent Real-time Fault Restoration of the Large Shipboard Power System Based on Genetic Algorithm," International Journal of Information Technology, vol. 11, No. 12, pp. 129-135, 2005.

W. P. Luan, M. R. Irving and J. S. Daniel, "Genetic algorithm for supply restoration and optimal load shedding in power system distribution networks," IEE Proceedings: Generation, Transmisison and Distribution, vol. 149, No. 2, pp. 145-151, Mar. 15, 2002.

Romeu M. V. Vitorino, Humberto M. M. Jorge and Luis M. P. Neves, "Network Reconfiguration Using a Genetic Approach for Loss and Reliability Optimization in Distribution Systems," Proceedings of the International Conference on Power Engineering, Energy and Electrical Drives, (POWERENG '09), pp. 84-89, Mar. 18, 2009.

James Stoupis, Zhenyuan Wang, Fang Yang, Vaibhav Donde, Fahrudin Mekic and William Peterson, "Restoring confidence," ABB Review: The Corporate Technical Journal of the ABB Group, vol. 3/2009, pp. 17-22, Sep. 10, 2009.

K. Aoki, K. Nara, M. Itoh, T. Satoh, H. Kuwabara, "A New Algorithm for Service Restoration in Distribution Systems," IEEE Transactions on Power Delivery, vol. 4, No. 3, pp. 1832-1839, Jul. 1989.

E.M. Carreno, N. Moreira, R. Romero, "Distribution network reconfiguration using an efficient evolutionary algorithm," Proceedings of the 2007 IEEE PES General Meeting.

Y. Fukuyama, H.D. Chiang, "A Parallel Genetic Algorithm for Service Restoration in Electric Power Distribution Systems," pp. 275-281, IEEE 1995.

Y.Y. Hsu, H.M. Huang, H.C. Kuo, S.K. Peng, C.W. Chang, K.J. Chang, H.S. Yu, C.E. Chow, R.T. Kuo, "Distribution System Service Restoration Using a Heuristic Search Approach," IEEE Transactions on Power Delivery, vol. 7, No. 2, pp. 734-740, Apr. 1992.

C.C. Liu, S.J. Lee, S.S. Venkata, "An Expert System Operational Aid for Restoration and Loss Reduction of Distribution Systems," IEEE Transactions on Power Systems, vol. 3, No. 2, pp. 619-626, May 1988.

K.N. Miu, H.D. Chiang, R.J. McNulty, "Multi-Tier Service Restoration Through Network Reconfiguration and Capacitor Control for Large-Scale Radial Distribution Networks," pp. 153-159, IEEE 1999.

K.N. Miu, H.D. Chiang, B. Yuan, G. Darling, "Fast Service Restoration for Large-Scale Distribution Systems with . Priority Customers and Constraints." IEEE Transactions on Power Systems, vol. 13, No. 3, pp. 789-795, Aug. 1998.

A.L. Morelato, A. Monticelli, "Heuristic Search Approach to Distribution System Restoration," IEEE Transactions on Power Delivery, vol. 4, No. 4, pp. 2235-2241, Oct. 1989.

Y.M. Park, K.H. Lee, "Application of Expert System to Power System Restoration in Sub-Control Center," IEEE Transactions on Power Systems, vol. 12, No. 2, pp. 629-635, May 1997.

G. Peponis, M. Papadopoulos, "Reconfiguration of radial distribution networks: application of heuristic methods on large-scale networks," IEE Proceedings on Generation, Transmission and Distribution, vol. 142, No. 6, pp. 631-638, Nov. 1995.

S. Toune, H. Fudo, T. Genji, Y. Fukuyama, Y. Nakanishi, "Comparative Study of Modern Heuristic Algorithms to Service Restoration in Distribution Systems," IEEE Transactions on Power Delivery, vol. 17, No. 1, pp. 173-181, Jan. 2002.

I. Watanabe, M. Nodu, "A Genetic Algorithm for Optimizing Switching Sequence of Service Restoration in Distribution Systems," pp. 1683-1689, IEEE 2004.

* cited by examiner

FIG. 8

GENERIC ALGORITHM (GA) BASED MULTI-LAYER RSA RESULTS

RESTORATION SWITCHING ANALYSIS SUMMARY

| OUTAGED AREA | | FAULTY (UNRECOVERABLE AREA) | |
|---|---|---|---|
| TOTAL KVA | 2790 | 100 | |
| # OF CUSTOMERS | 273 | 9 | |

UPSTREAM FAULT ISOLATION DEVICE: SW-IFANET-2 (ID: 151341)

| # OF NETWORK LAYERS | 2 | # OF CHECKED NETWORK TOPOLOGIES: | 332 |
|---|---|---|---|
| # OF NETWORK LAYERS | 10 | | |

SWITCHING PLAN EVALUATION

| | WEIGHT |
|---|---|
| UNSERVED LOAD(0,100): | 71.3279 |
| # OF BACK-PATH VIOLATIONS: | 1 |
| # OF SWITCH VIOLATIONS: | 1 |
| BASE KW IN GA EVALUATION: | 577240 |
| BASE # OF B-P VIOLATIONS: | 129 |
| BASE # OF SW VIOLATIONS: | 8 |

RESTORATION SWITCHING PLANS — SAVE THE SELECTED PLAN — EXECUTE THE SELECTED PLAN

| PLAN | % LOAD SERVED AFTER RESTORATION | # OF SWITCHING OPERATIONS | # OF PATH VIOLATIONS | PLAN FITNESS (LESS IS BETTER) | PLAN EX |
|---|---|---|---|---|---|
| 1 | 100.0000 | 2 | 3 | 0.3347 | NO |
| 2 | 100.0000 | 2 | 42 | 0.7470 | NO |
| 3 | 100.0000 | 4 | 45 | 1.0818 | NO |
| 4 | 99.8659 | 3 | 45 | 1.4734 | NO |
| 5 | 99.7257 | 1 | 30 | 1.5793 | NO |
| 6 | 99.7257 | 1 | 36 | 1.6427 | NO |

SWITCHING SEQUENCES FOR THE SELECTED RESTORATION SWITCHING PLAN

| SW SEQ | SWITCH INT. ID | SWITCH STR. ID | SWITCH NAME | SWITCH POSITION | SWITCH OPERATION |
|---|---|---|---|---|---|
| 1 | 151341 | SW-IFANET-2 | SW-IFANET-2 | CLOSED | OPEN |
| 2 | 150514 | SW-IFANET-1 | SW-IFANET-1 | CLOSED | OPEN |
| 3 | 18237 | RCR03-RCR09 | RCR03 | OPEN | CLOSED |
| 4 | 143868 | RBX58-RBX73-2 | RBX58 | OPEN | CLOSED |

GENERIC ALGORITHM (GA) BASED MULTI-LAYER RSA RESULTS

RESTORATION SWITCHING ANALYSIS SUMMARY

| | | |
|---|---|---|
| TOTAL KVA | 2790 | |
| # OF CUSTOMERS | 273 | |
| OUTAGED AREA | | |
| FAULTY(UNRECOVERABLE AREA) | 100 | |
| | 9 | |
| UPSTREAM FAULT ISOLATION DEVICE | SW-IFANET-2(ID: 151341) | |
| # OF NETWORK LAYERS | 2 | |
| # OF NETWORK LAYERS | 10 | |
| # OF CHECKED NETWORK TOPOLOGIES: | 332 | |

SWITCHING PLAN EVALUATION

| | WEIGHT |
|---|---|
| UNSERVED LOAD(0,100): | 71.3279 |
| # OF BACK-PATH VIOLATIONS: | 1 |
| # OF SWITCH VIOLATIONS: | 1 |
| BASE KW IN GA EVALUATION: | 577240 |
| BASE # OF B-P VIOLATIONS: | 129 |
| BASE # OF SW VIOLATIONS: | 8 |

RESTORATION SWITCHING PLANS    SAVE THE SELECTED PLAN    EXECUTE THE SELECTED PLAN

| PLAN | % LOAD SERVED AFTER RESTORATION | # OF SWITCHING OPERATIONS | # OF PATH VIOLATIONS | PLAN FITNESS (LESS IS BETTER) | PLAN EX |
|---|---|---|---|---|---|
| 1 | 100.0000 | 2 | 3 | 0.3347 | NO |
| 2 | 100.0000 | 2 | 42 | 0.7470 | NO |
| 3 | 100.0000 | 4 | 45 | 1.0818 | NO |
| 4 | 99.8659 | 3 | 45 | 1.4734 | NO |
| 5 | 99.7257 | 1 | 30 | 1.5793 | NO |
| 6 | 99.7257 | 1 | 36 | 1.6427 | NO |

SWITCHING SEQUENCES FOR THE SELECTED RESTORATION SWITCHING PLAN

| SW SEQ | SWITCH INT. ID | SWITCH STR. ID | SWITCH NAME | SWITCH POSITION | SWITCH OPERATION |
|---|---|---|---|---|---|
| 1 | 151341 | SW-IFANET-2 | SW-IFANET-2 | CLOSED | OPEN |
| 2 | 150514 | SW-IFANET-1 | SW-IFANET-1 | CLOSED | OPEN |
| 3 | 18237 | RCR03-RCR09 | RCR03 | OPEN | CLOSE |
| 4 | 143868 | RBX58-RBX73-2 | RBX58 | OPEN | CLOSE |
| 5 | 18351 | RCF89-RCF91-1 | RCF91 | OPEN | CLOSE |
| 6 | 128124 | BS73BL-LOE90-2 | BS73BL | CLOSED | OPEN |

OK

RESTORATION SWITCHING ANALYSIS WITH GENETIC ALGORITHM

CROSS REFERENCE TO RELATED APPLICATIONS

This application is a 35 U.S.C. §371 national stage filing of International Application No. PCT/US2010/058881, filed Dec. 3, 2010, which claimed the benefit of and priority to U.S. Provisional Patent Application Ser. No. 61/266,691, filed Dec. 4, 2009. The complete disclosures of the above-identified patent applications are hereby incorporated by reference for all purposes.

BACKGROUND

An electric power distribution system generally consists of a set of distribution substations, feeders, switches (circuit breakers, reclosers, etc.) electrical loads, and monitoring and control devices. A distribution system delivers electricity from distribution substations via feeders and switches to electrical loads (customers) that connect to feeders. Feeders in a distribution system are usually configured in a radial type to ensure that each load is supplied by only one distribution substation (source) via one feeder at any instant. To maintain the radial configuration, each feeder is linked by normally open (NO) tie-switches to neighboring feeders. The feeder section that is relatively near/far to its source is referred to as upstream/downstream section, while comparing to the feeder section that is relatively far/near to its source. One or more switches in the distribution system may have an associated intelligent electronic device (IED) that has the following monitoring and control functions: (1) measuring and recording electrical and other types of switch related quantities, such as voltage, current, reclosing times (2) monitoring the switch status, (3) operating the switch between open or close, and (4) communicating information to one or more master devices.

Distribution system reliability can be greatly improved by automating feeder operations such as fault detection, isolation, and load restoration. In such systems, IEDs associated with switches monitor the distribution system and communicate the corresponding information to the feeder automation master controllers located in substations. If a fault occurs in the distribution system, the master controller identifies the fault location, generates fault isolation and service restoration solutions in terms of a sequence of switch operations, and sends switching commands to IEDs to control corresponding switches.

An example distribution network is shown in FIG. 1, in a normal operation mode wherein loads are omitted for simplicity, sources (S1 to S7) are oval shaped, NO switches (5, 10, 13, 16, 19, 24, 29) are square shaped, with a diagonal hatch pattern, and normally closed (NC) switches (other numbers) are square shaped, with a vertical hatch pattern. If a fault occurs between switch 1 and 2, the protection function of switch 1 causes switch 1 to open, thereby causing the dashed line circled area to lose power. The boundary switches of the faulted portion of the distribution network include switch 1 and 2. Switch 2 is immediately downstream of the faulted section and thus, is the isolation switch. With reference to FIG. 2, when switches 1 and 2 are open, the faulted portion is isolated and a remaining unserved area is bound by isolation switch 2 and NO switches 5 and 16.

Switches 5 and 16 are referred to as first layer (Layer 1) restoration switches. If the sources, in this case S4 and S7, respectively, can provide the power to the area that is left unserved due to fault isolatin, a first layer restoration solution is possible. If the first layer sources are not capable of providing power to the unserved area, second or even third layer solutions must be performed to provide power to the unserved area. For example, the power sources for layer 2 are S2 and S5. The power sources for a third layer solution are S3 and S6. As should be evident, the second and third layer restoration switches are topologically more "distant" than the first layer restoration switches.

The process to obtain a restoration solution beyond layer 1 is called multi-layer (or multiple-layer) restoration service analysis (RSA). This is sometimes also referred to as a multi-tier service restoration problem, which may be classified as one type of network reconfiguration problems. Due to the potentially large number of switches involved in a multi-layer restoration solution, the process to obtain such solution is generally more challenging than a single-layer solution. With any network reconfiguration problem it is desirable to achieve: computational efficiency, avoiding network violations, minimized switching operations and radiality of the restored network topology.

Network reconfiguration problems may also seek to reduce the overall system loss and relieve overloading conditions in the network. Therefore, a network reconfiguration problem may either be formulated as a loss reduction optimization problem or a load balancing optimization problem. Under normal system operation conditions, network configuration allows the periodical transfer of load from heavily loaded portions of the distribution network to relatively lightly loaded ones, and thus takes advantage of the large degree of load diversity that exists in many distribution systems. Under abnormal system operation conditions, such as planned or forced system outages, the network reconfiguration problem becomes a service restoration problem, which is a special load balancing problem, where the main objective is to restore as many out-of-service loads as possible, without violating system operating and engineering constraints.

As with any other type of network reconfiguration problem, service restoration is a highly complex combinatorial, non-differential, and constrained optimization problem, due to the high number of switching elements in a distribution network, and the non-linear characteristics of the constraints used to model the electrical behavior of the system.

There is therefore a need in the art for a restoration switching analysis method that properly accounts for a greater number of variables and efficiently processes multiple-layer RSA solutions.

SUMMARY OF THE INVENTION

According to one aspect of the present invention, a method is provided for determining back-feed paths to one or more out-of-service load areas in a network after fault isolation. The method includes defining a chromosome architecture for creating a plurality of unique chromosomes, each said chromosome being a string of characters, each said character representing one of a list of actions for a normally open switch in said network, said list of actions including (1) remaining open, (2) closing, or (3) swapping with a normally closed switch selected from a group of corresponding normally closed switches. A chromosome list is initialized. The chromosome architecture is used to create initial chromosomes for a first chromosome population, for each initial chromosome, if valid and not in the chromosome list, the initial chromosome is added to the initial chromosome population. For each initial chromosome created to the initial population, it is also added to the chromosome list. Fitness function values are generated for each chromosome in the initial chromosome population. The chromosomes are then sorted by fitness function value, where the chromosome having the lowest fitness function value is considered the best candidate chromosome. If the fitness function value of the best candidate chromosome is below a threshold fitness value the network configuration corresponding to the best candidate chromosome is output. If the fitness function value of the best candidate chromosome is not below the threshold fitness value, genetic manipulation is used to create new chromosomes for a new chromosome population. During the creation of the new chromosome population, any new chromosomes already in the chromosome list are rejected. Each new chromosome in the new population is also added to the chromosome list. Fitness function values are again generated for each chromosome in the new population. The generation of new populations are repeated in the same manner until the fitness function value of the best candidate chromosome is below the threshold fitness value or until a predetermined number of new populations are created, whereupon a network configuration corresponding to the best candidate chromosome is output.

BRIEF DESCRIPTION OF THE DRAWINGS

FIG. 8 is an exemplary user interface displaying the results of the method of the present invention.

FIG. 9 is an exemplary user interface according to FIG. 8 showing a different set of exemplary results.

DETAILED DESCRIPTION OF THE INVENTION

Figure 1:
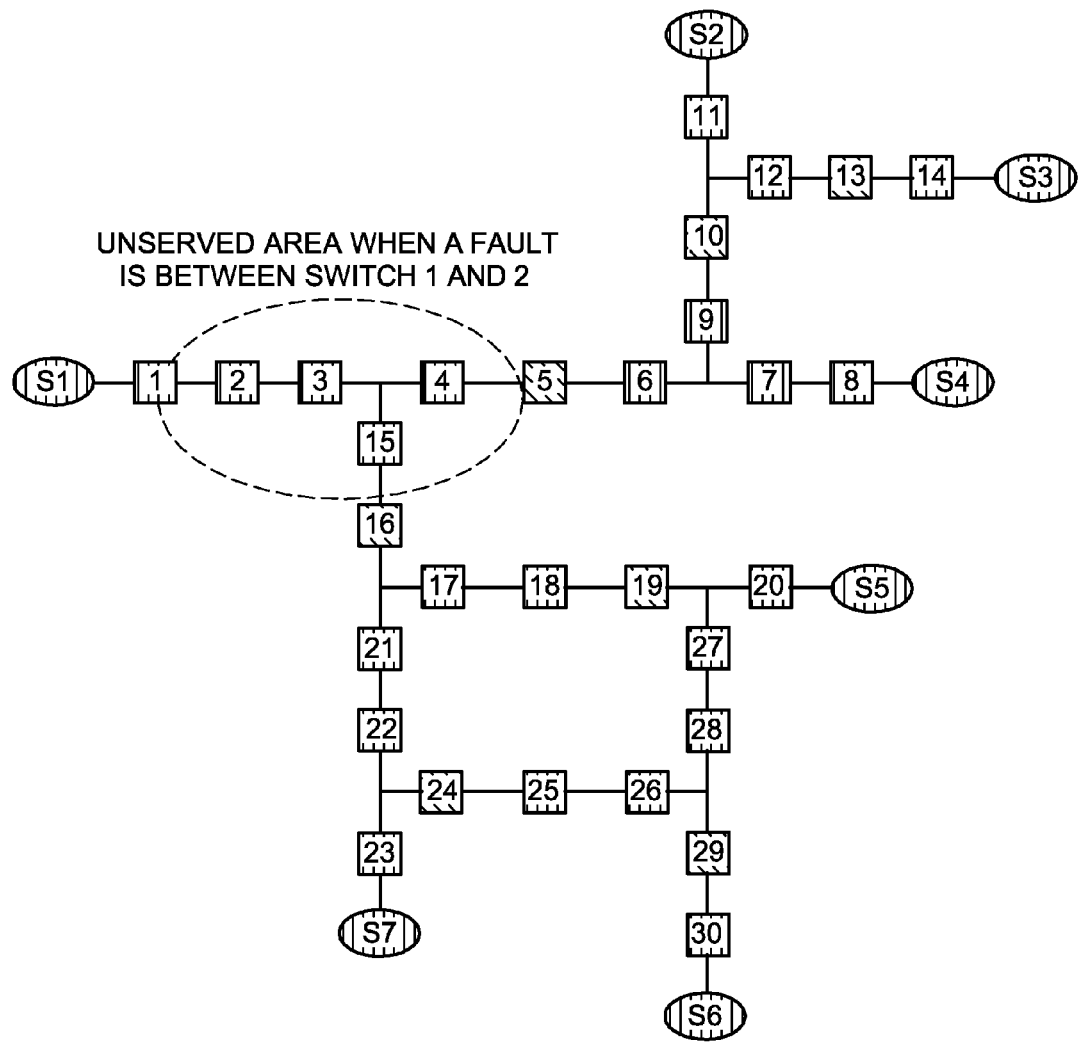
FIG. 1 is a schematic drawing of an exemplary distribution network.
Figure 2:
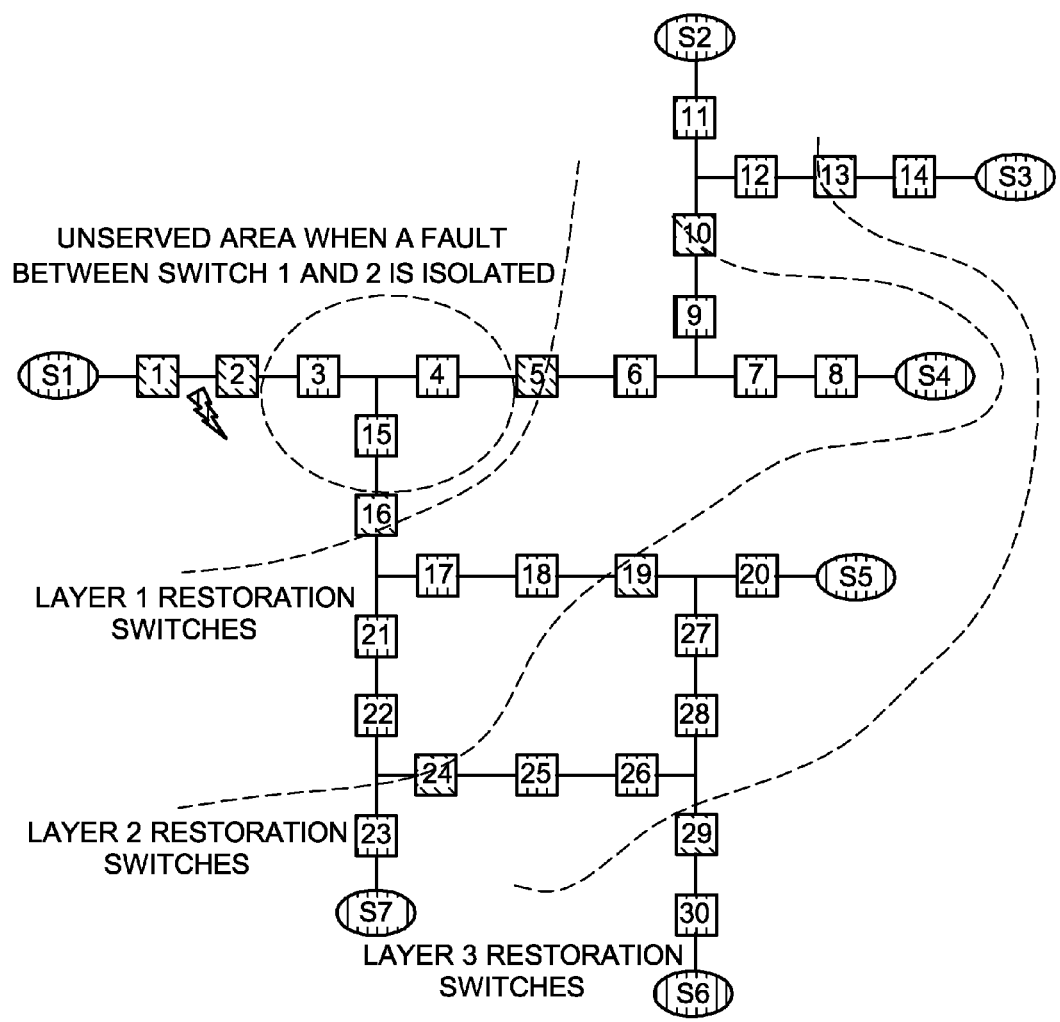
FIG. 2 is a schematic drawing of the exemplary distribution network of FIG. 1 wherein a simulated fault is isolated and restoration layers are shown.
Figure 3:
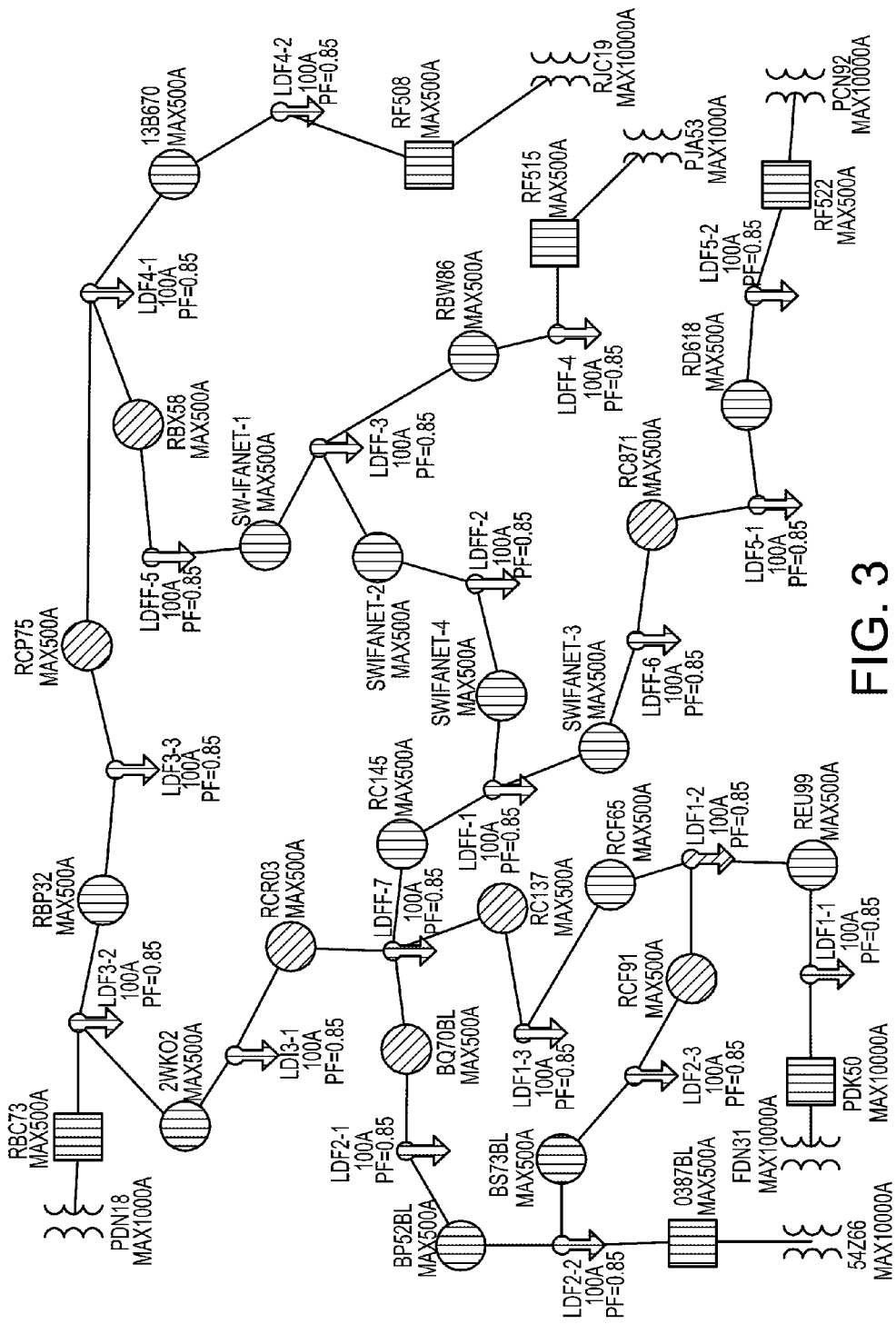
FIG. 3 is a schematic drawing of a second exemplary distribution network.
Figure 4:
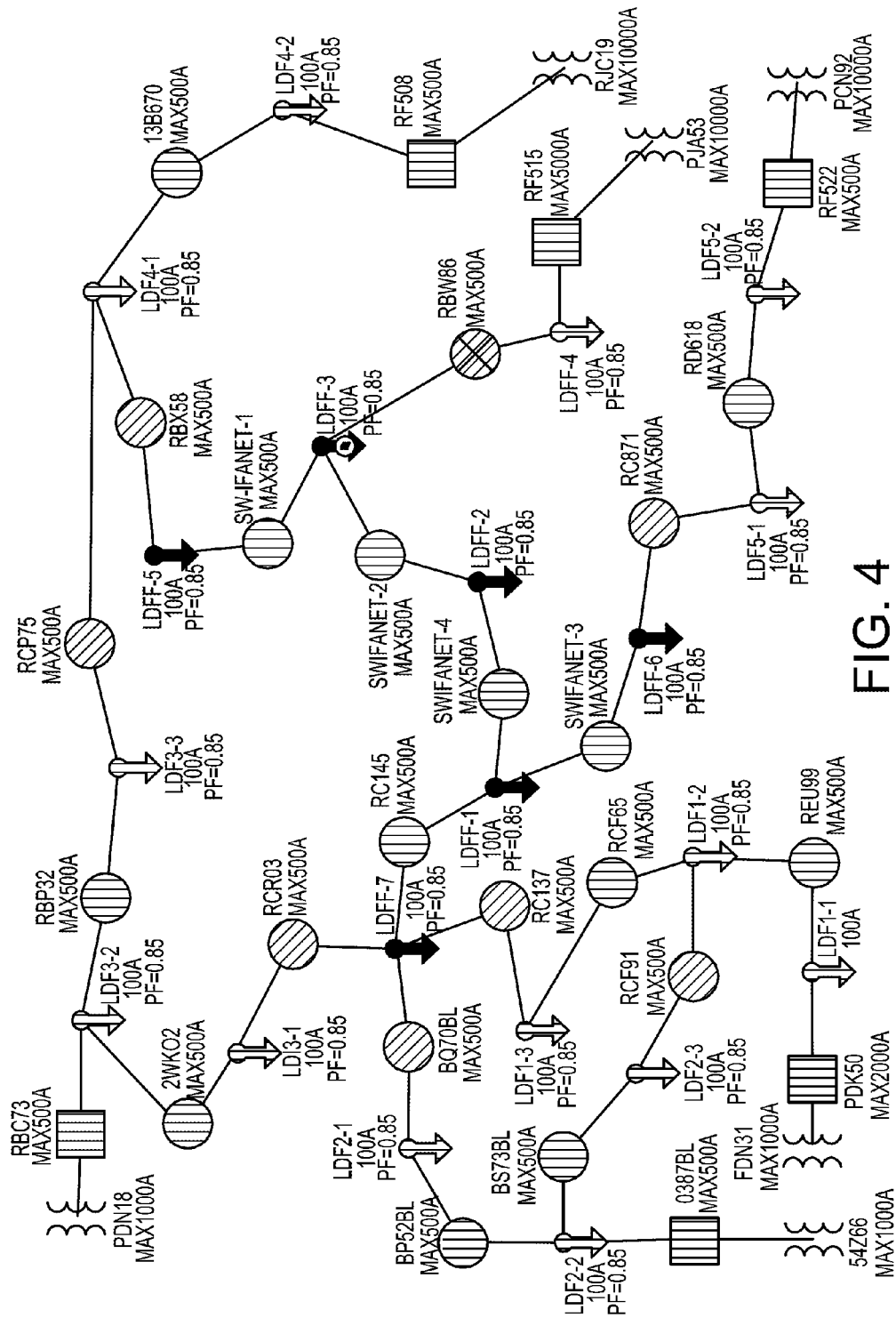
FIG. 4 is a schematic drawing of the exemplary distribution network of FIG. 3 wherein a fault occurs.

The methods of the present invention are applicable to both single layer and multi-layer RSA problems. With reference to FIG. 3, an example distribution network is shown in a normal operating topology. FIG. 4 shows the network of FIG. 3 wherein a fault occurred at load LDff-3. As can be seen, in such a scenario upstream recloser RBW85 senses the fault, proceeds through a reclosing sequence, and finally locks-out (remains open). This results in an outage area including loads LDff-1, LDff-2, LDff-3, LDff-5, LDff-6 and LDff-7.

Figure 5:
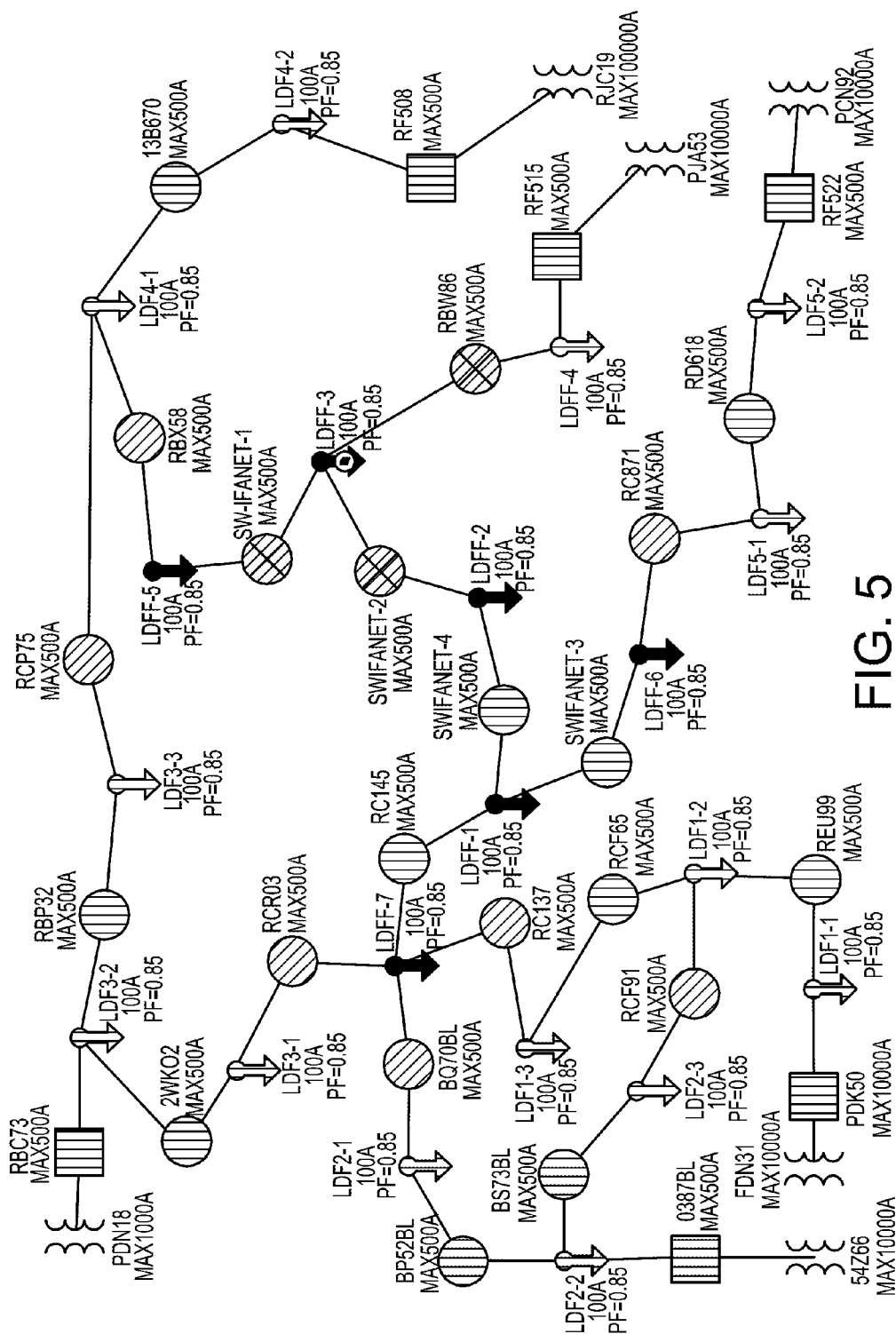
FIG. 5 is a schematic drawing of the exemplary distribution network of FIG. 3 wherein the fault is isolated leaving two out-of-service areas.

In a next step, the faulted load is isolated from the out-of-service area. With reference to FIG. 5, in the example network, the isolation switches include the immediately downstream switches SW-ifanet-1 and SW-ifanet-2. Once switches SW-ifanet-1 and SW-ifanet-2 are opened, power restoration to the out-of-service area can begin.

In the present example, two separate out of service areas (OOSA) are formed after fault isolation. OOSA1 includes LDff-5 and OOSA2 includes LDff-1, LDff-2, LDff-6 and LDff-7. Each OOSA can be back-fed by one or more (if the OOSA is separable into different sub-areas) of the remaining back-feed sources. The restoration problem is complex because of the large number of back-feed sourcing combinations. For example, in the network of FIG. 5, source PDN16 may be a single-layer back-feed source for OOSA2 and/or a second-layer back-feed source for OOSA1. Depending on the final network configuration, source 54Z66 could be a single-layer or second-layer back-feed source for OOSA2. The restoration problem is further complicated because the OOSA could be partitioned (by opening switches RC145, SW-ifanet-3 or SW-ifanet-4).

According to the present invention, solving for a network configuration that back-feeds the OOSAs first requires that a chromosome architecture of a genetic algorithm (GA) be developed. A chromosome represents a particular network topology and, according to the present invention, is represented by a string of fixed length. According to the present invention, the string length is determined by the number of normally open (NO) switches (also known as tie switches) in the pre-fault network. Each character in the chromosome (also referred to as a bit or gene) represents the application options with respect to that tie switch. For each tie switch, three options are available: (1) the tie switch can remain unchanged and stay open; (2) the tie switch can be closed; or (3) the tie switch may be swapped with another normally closed (NC) switch. According to the third option, "swapping" means that the tie switch would close and the identified NC switch would open. A swap switch is an NC switch that is either, upstream of the tie switch or is an NC switch in the OOSA adjacent thereto.

Each tie switch has a specific set of corresponding swap switches. The set of swap switches may be determined by running a network tracing from the tie switch to its respective source(s). This is otherwise known as back-path tracing. For each of the first-layer tie switches, only one source can be traced to. For each of the higher layer switches, two sources can be traced to. In addition to the back-traced switches, for a tie switch that bounds an OOSA, the set of corresponding swap switches also includes the NC switches in that OOSA.

In order to simplify the restoration problem solution, according to one embodiment, the feeder breakers may be excluded from the listing of available swap switches. According to another aspect of the invention, the listing of available swap switches for a given tie switch may be further limited by limiting the number of switches that are swappable in the back-feed path. For example, for a given tie switch, the available back-feed swap switches may be limited to the first N number of upstream NC switches.

For the example of FIG. 5, the first layer tie switches are: RCR03, BQ70BL, RC137, RC871, and RBX58. The second layer tie switches are: RCF91 and RCP75. If the number of back-feed switches to be considered is limited to N=1, the respective swap switch sets for the first and second layer tie switches are:

| | | |
|---|---|---|
| RCR03- | RC145, SW-ifanet-3, SW-ifanet-4, 2WK02 | (first layer) |
| BQ70BL- | RC145, SW-ifanet-3, SW-ifanet-4, BP52BL | (first layer) |
| RC137- | RC145, SW-ifanet-3, SW-ifanet-4, RCF65 | (first layer) |
| RC871- | RC145, SW-ifanet-3, SW-ifanet-4, RD618 | (first layer) |
| RBX58- | 13B670 | (first layer) |
| RCF91- | BS73BL, REU99 | (second layer) |
| RCP75- | RBP32, 13B670 | (second layer) |

According to one embodiment of the present invention, the gene representation of the swap switch sets uses a single character to represent the action for each tie switch. According to one embodiment, an ASCII character may be used to represent each swap switch or other action (i.e. open or close). Thus, a space character (hereinafter represented as "L" for clarity) (ASCII value 32) may represent "remain open" and character "!" (ASCII value 33) may represent the "close" action. Characters having an ASCII value higher than 33 may represent the "swap status with swapped switch N." Because the ASCII characters are used, a large number of representative variables are available (255−33=222 unique switch swaps).

To create the chromosomes, the tie switches are arranged in any order. According to the example network of FIG. 5, the tie switches are arranged in the following manner: [RCR03, BQ70BL, RC137, RCF91, RC871, RBX58, RCP75]. The swapped switches are associated with a character in the following manner:
"—RC145
—SW-ifanet-3
$—SW-ifanet-4
%—2WK02
&—BP52BL
'—RCF65
(—RD618
)—13B670
*—BS73BL
+—REU99
,—RBP32

Valid chromosomes include: [! L L L L ! L] which correlates to a network where RCR03 and RBX58 are closed and all other tie switches remain open; [L!L*L!L] which correlates to a network where BQ70BL and RBX58 are closed and RCF91 and BS73BL are swapped (i.e. BS73BL closes and RCF91 opens); [!LLLL)!] which correlates to a network where RCR03 and RCP75 are closed and RBX58 is swapped with 13B670 (i.e. RBX58 closes and 13B670 opens).

As will be described later in greater detail, for each candidate network, it's suitability for a final solution is judged by calculating a fitness function value. According to one embodiment, a fitness function is defined below, wherein the objective is to minimize the value of this function:

$$\text{fit}(idv) = w_{Sw} SwOp_{nr}(idv) + w_{Ivio} Ivio_{nr}(idv) + w_P P_{nr}(idv) \quad \text{(Eq. 1)}$$

Where idv is the index of the individual network topology (hereafter the candidate system) to be evaluated (corresponds to the chromosomes generated in the genetic algorithm below). Ivionr is the normalized number of back-path current violations in the candidate network, SwOpnr is the normalized switching operations (excluding isolation switching) and Pnr is the normalized total unserved load for the candidate network. The corresponding weighting factors are represented by wIvio, wSw, wp. The weighting factor definition in Eq. 1 allows the users of this algorithm to place an emphasis on different optimization variables, thereby increasing the application flexibility. It should be appreciated that, though the above fitness function is well suited for the present invention, additional factors may be considered in a fitness function, such as, for example, minimizing system losses or voltage violations.

According to one embodiment of the present invention Pnr reduces faster than the other two components of the fitness function, thus after a few generations the contributions from SwOpnr and Ivionr would dominate the final fitness values. In order to achieve a balanced contribution solution, the weight wp may be increased by a factor larger than 1 (for example 1.05) for each new generation of chromosomes.

The calculation of the normalized values is defined according to the following:

$$SwOp_{nr}(idv) = \text{NoSwitchOperations}(idv)/\text{NoTieSwitches}_{base} \quad \text{(Eq. 2)}$$

$$P_{nr}(idv) = (\text{TotalWeightedLoad}_{base} - \text{TotalWeightedLoad}(idv))/\text{TotalWeightedLoad}_{base} \quad \text{(Eq. 3)}$$

Where base represents the network in the post-isolation configuration and (idv) represents the candidate network. NoTieSwitchesbase is the total number of NO tie switches in the network. NoSwitchOperations is the number of switch operations (excluding isolation switching operations) needed for the transition from the fault isolated system state (the base configuration) to the candidate network configuration. TotalWeightedLoad is the weighted total load of the candidate network corresponding to a chromosome:

$$\text{TotalWeightedLoad} = \Sigma \text{LoadinOOSAreas} + \text{PenaltyFactor} \ast \Sigma \text{LoadinBackFeedingAreas} \quad \text{(Eq. 4)}$$

As the objective is to minimize the fitness function value, the PaneltyFactor of Eq. 4 is advantageously greater than 1, to prevent load shedding in the back-feeding areas. The calculation of the normalized current violations Ivionr is performed according to the following: for each chromosome in a generation, the corresponding network is created and a balanced or unbalanced load flow analysis is conducted. From the results of the load flow analysis, the current violations from the closed switches and all the feeder sections to their sources are counted. These current violations are referred to as the back-path current violations. Of all the chromosomes in a generation, the network having the largest number of current violations Iviomax is determined, and that number is used according to:

$$Ivionr = Ivio(idv)/Iviomax \quad \text{(Eq. 5)}$$

Figure 6:
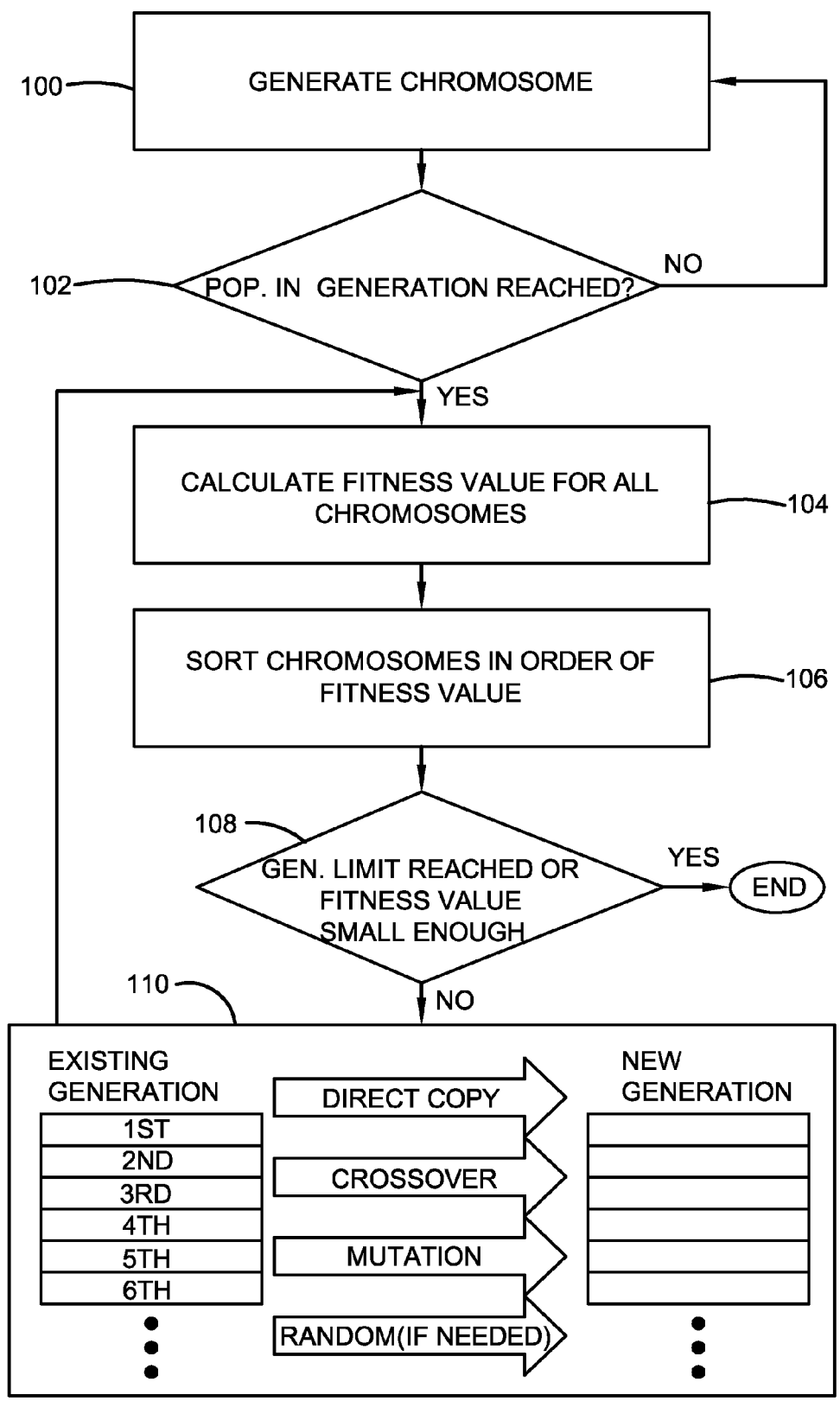
FIG. 6 is a flow-chart showing an exemplary algorithm of the present invention.

With reference now to FIG. 6, a flow-chart shows the process according to the present invention. As discussed above, the process begins after a fault is isolated on a network. Thereafter, the process according to the present invention is evoked at 100. At step 100 new chromosomes are randomly created in accordance with the methods discussed above. Thus, chromosomes are created wherein each NO tie switch is either left open, closed, or swapped with a NC switch. Concurrently, the new chromosomes are validated to ensure no energized loops are created. If so, the chromosome is discarded. A Reactive Tabu Search (RTS) is incorporated, by defining a search list $LST_{RTS}$ that contains the chromosomes or indices of each candidate network. Thus, each newly created chromosome (whether valid or not) is added to the $LST_{RTS}$.

To limit the genetic algorithm processing time, a population size is defined for each generation. According to one embodiment, the population size=4*N+1; where N=NoTieSwitchesbase/2 (N is an integer) and where N<=10. Thus, for the example network of FIGS. 5, 7 normally open tie switches are included in the base network, giving a population size of 13 (where N is rounded from 3.5 to 3).

At step 102, it is determined whether the number of valid chromosomes has reached the population limit. New chromosomes are generated until the population number is reached. At step 104, a fitness value (see eq. 1) is calculated for each chromosome in the generation. As discussed above, for the population of chromosomes, for each chromosome, the corresponding network is determined and a balanced or unbalanced load flow analysis is conducted to determine current violations and total weighted load which is used in the fitness function value calculation.

At step 106 the chromosomes are sorted in order of fitness value, wherein the lowest fitness value is "best" or 1st. At step 108 it is determined whether either the generation limit is reached or if the best fitness value is below a threshold value. If either case is true, the network configuration corresponding to the best chromosome is output as the solution. The solution may be sent to a DMS or other distribution control manager for implementation to restore power to some or all of the OOSA. The generation limit is a user defined (or default) maximum generation number that effectively limits the iterations the algorithm proceeds through. The fitness function threshold value is a user defined (or default) value for the fitness function, wherein network configurations having a fitness function value below the threshold are "good" solutions. This is because a low fitness function value indicates; (1) minimized current violations, (2) minimized switching operations and (3) minimized unserved load.

If the best chromosome does not have a fitness value beneath the threshold value and the max generation number has not yet been reached, the algorithm proceeds to step 110. At step 110 a new generation of chromosomes are created using genetic manipulations. According to one embodiment, the best N+1 chromosomes (chromosomes with the lowest fitness function values) from the previous generation are directly copied into the new generation. Next, crossover is used to create N new chromosomes. Next, mutation is used to create N new chromosomes. As is known in the art, a crossover is accomplished by merging any two generated chromosomes randomly and mutations are accomplished by randomly redoing one or more of the swappings or open/close actions in a chromosome. The additional chromosomes needed to complete the generation are created by random chromosome creation. Each newly created chromosome (not the direct copies) is checked for validity and against LSTrts. If the chromosome is not valid (energized loops), it is added to the LSTrts and is not added to the new generation. If the chromosome is already in LSTrts the chromosome is not added to the new generation. If the chromosome is valid and not in the LSTrts, it is added to the new generation and to the LSTrts.

According to one embodiment, the cross-over is performed using the topmost (lowest fitness function value) chromosome with the next N chromosomes to generate N new chromosomes. Next, the direct copied N chromosomes each mutate once to generate the next N chromosomes.

Once the new generation of chromosomes is created, the process returns to step 104, and in this manner, the process repeats until a good solution (below the fitness function threshold) is reached or until the maximum generation number is reached.

Figure 7:
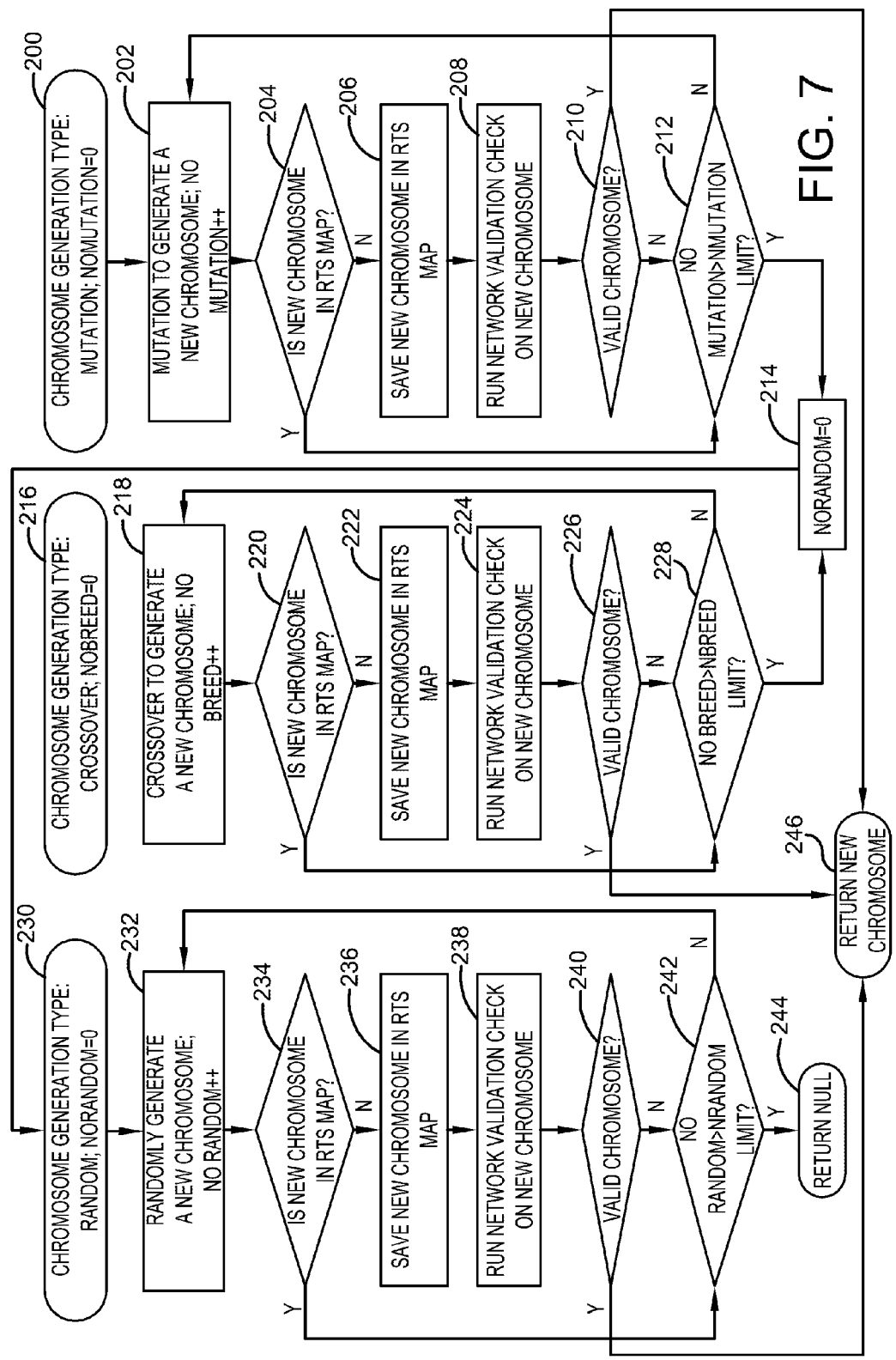
FIG. 7 is a flow-chart showing the step of creating a new generation in greater detail.

With reference now to FIG. 7, a flow-chart shows the step 110 of creating a new generation in greater detail. At 200 the mutation function begins by initializing the NoMutation variable to zero. Next, at 202 a chromosome mutation is performed to create a NewChromosome and the NoMutation variable is increased by one. At 204 it is determined whether the NewChromosome is in the RTSmap (i.e. LSTrts). If so, the algorithm proceeds to step 212 where it is determined whether NoMutation variable is greater than NmutationLimit. If so, the algorithm proceeds to step 214, which will be described in greater detail below. If not, the algorithm proceeds back to step 202. If, at 204 it is determined that the NewChromosome is not in the RTSmap, the algorithm proceeds to step 206 where the NewChromosome is saved in the RTSmap. Next, at 208 a network validation check is performed on the NewChromosome to identify energized loops (i.e. invalid network configurations). If the NewChromosome is valid it is added to the new generation at 246. If the NewChromosome is not valid, the algorithm proceeds to 212, where it is determined whether NoMutation is greater than NmutationLimit.

The crossover function begins at 216 by initializing the NoBreed variable to zero. Next, at 218 a chromosome crossover is performed to create a NewChromosome and the NoBreed variable is increased by one. At 220 it is determined whether the NewChromosome is in the RTSmap (i.e. LSTrts). If so, the algorithm proceeds to step 228 where it is determined whether NoBreed variable is greater than NbreedLimit. If so, the algorithm proceeds to step 214, which will be described in greater detail below. If not, the algorithm proceeds back to step 218. If, at 220 it is determined that the NewChromosome is not in the RTSmap, the algorithm proceeds to step 222 where the NewChromosome is saved in the RTSmap. Next, at 224 a network validation check is performed on the NewChromosome to identify energized loops (i.e. invalid network configurations). If the NewChromosome is valid it is added to the new generation at 246. If the NewChromosome is not valid, the algorithm proceeds to 228, where it is determined whether NoBreed is greater than NbreedLimit.

As can be seen, if either the crossover or the mutation functions reach their limit, the algorithm proceeds to step 214, where the NoRandom variable is initialized to zero. The algorithm then proceeds to step 230 where the random chromosome generation function begins. The random chromosome generation function may also be called independently, in which case the process would begin at 230. Next, at 232 a chromosome is created by randomly closing or swapping one or more NO tie switches. The NoRandom variable is increased by one. At 234 it is determined whether the NewChromosome is in the RTSmap (i.e. LSTrts). If so, the algorithm proceeds to step 242 where it is determined whether NoRandom variable is greater than NrandomLimit. If so, the algorithm proceeds to step 244, which returns a null (meaning no additional chromosome can be generated). If not, the algorithm proceeds back to step 232. If, at 234 it is determined that the NewChromosome is not in the RTSmap, the algorithm proceeds to step 236 where the NewChromosome is saved in the RTSmap. Next, at 238 a network validation check is performed on the NewChromosome to identify energized loops (i.e. invalid network configurations). If the NewChromosome is valid it is added to the new generation at 246. If the NewChromosome is not valid, the algorithm proceeds to 242, where it is determined whether NoRandom is greater than NrandomLimit.

Thus, for each generation, N crossover calls, N mutation calls and at least N random calls will be made. The ultimate number of random calls may be higher depending on the results of the crossover and mutation calls. (i.e. if NoMutation or NoBreed exceeds NmutationLimit or NbreedLimit respectively.)

With reference now to FIGS. 8 and 9, an exemplary graphical user interface is shown. The interface shown displays the results of the algorithms discussed above. As can be seen, the "Restoration Switching Plans" area displays the final generation, wherein the chromosomes are sorted in order of fitness value (lowest being first). As can also be seen, when a chromosome is highlighted, (chromosome 1 in FIG. 8 and chromosome 3 in FIG. 9) the corresponding switching sequence is displayed in the "Switching Sequences for the Selected Restoration Switching Plan" area. As can be seen, for completeness and clarity, the switching sequences provided in the "Switching Sequences for the Selected Restoration Switching Plan" includes the switching operations for both isolation (the determination of which is not the subject of the present invention) and restoration, which is determining in the manner discussed above.

The method of the present invention requires network load flow calculations (in order to evaluate the fitness function) only for the valid chromosomes in question, as opposed to many more load flow calculations if approaches such as classical genetic algorithm, network tracing or deterministic optimization methods are used. This increases the speed of solution finding, thus making it appropriate for real-time restoration switching applications. It is especially practical for multi-layer RSA, when the network topology is complex (for example, many tie switches between adjacent feeders) and many different alternatives for back-feed restoration exist. The functionality of multi-layer RSA would reside at either at DMS or in a sub-station. Thus, the network configuration (solution) is generated by the DMS or sub-station control system. The DMS or sub-station control system then implements the switching operations to convert the network topology to match the network configuration solution. In this manner, power is restored to the OOSAs.

As will be appreciated by one of ordinary skill in the art, the present invention may be embodied as or take the form of the method and system previously described, as well as of a computer readable medium having computer-readable instructions stored thereon which, when executed by a processor, carry out the operations of the present inventions as previously described. The computer-readable medium may be any medium that can contain, store, communicate, propagate, or transport the user-interface program instruction for use by or in connection with the instruction execution system, apparatus, or device and may by way of example but without limitation, be an electronic, magnetic, optical, electromagnetic, infrared, or semiconductor system, apparatus, device, or propagation medium or other suitable medium upon which the program is printed. More specific examples (a non-exhaustive list) of the computer-readable medium would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the present invention may be written in any suitable programming language provided it allows achieving the previously described technical results.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for determining back-feed paths to one or more out-of-service load areas in a network after fault isolation, the method comprising:
   i. defining a chromosome architecture for creating a plurality of unique chromosomes, each said chromosome being a string of characters, each said character representing one of a list of actions for a normally open switch in said network, said list of actions including (1) remaining open, (2) closing, or (3) swapping with a normally closed switch selected from a group of corresponding normally closed switches;
   ii. initializing a chromosome list;
   iii. using said chromosome architecture, creating initial chromosomes for a first chromosome population, for each said initial chromosome, if valid and not in said chromosome list, adding said initial chromosome to said initial chromosome population; for each said initial chromosome created, adding said initial chromosome to said chromosome list;
   v. generating fitness function values for each chromosome in said initial chromosome population;
   vi. sorting said chromosomes by fitness function value, said chromosome having the lowest fitness function value being the best candidate chromosome;
   vii. determining if the fitness function value of said best candidate chromosome is below a threshold fitness value, and if so, outputting a network configuration corresponding to said best candidate chromosome;
   viii. if said fitness function value of said best candidate chromosome is not below said threshold fitness value, using genetic manipulation to create new chromosomes for a new chromosome population, during said creation of said new chromosome population, rejecting any new chromosomes already in said chromosome list and adding said new chromosomes in said new population to said chromosome list;
   ix. generating fitness function values for each chromosome in said new population; and
   x. repeating steps vi-ix until the fitness function value of said best candidate chromosome is below said threshold fitness value or until a predetermined number of new populations are created, whereupon a network configuration corresponding to said best candidate chromosome is output.

2. The method of claim 1 wherein said fitness function comprises:

$$\mathrm{fit}(idv) = w_{Sw} SwOp_{nr}(idv) + w_{Ivio} Ivio_{nr}(idv) + w_P P_{nr}(idv)$$

where idv is an index of an individual network topology corresponding to a chromosome (hereinafter candidate network); Ivionr is a normalized number of back-path current violations in the candidate network; SwOpnr is the normalized switching operations for the candidate network; Pnr is the normalized total unserved load for the candidate network; and wIvio, wSw, wp are user definable weighting factors.

3. The method according to claim 2 wherein weighting value wp is increased by a factor larger than 1 for each new generation of chromosomes.

4. The method of claim 2 wherein:

$$SwOp_{nr}(idv) = \mathrm{NoSwitchOperations}(idv)/\mathrm{NoTieSwitches}_{base}$$

$$P_{nr}(idv) = (\mathrm{TotalWeightedLoad}_{base} - \mathrm{TotalWeightedLoad}(idv))/\mathrm{TotalWeightedLoad}_{base}$$

where base represents said network in a post-isolation configuration and (idv) represents the candidate network; NoTieSwitchesbase is the total number of normally open tie switches in said network; NoSwitchOperations is the number of switch operations, excluding isolation switching operations, needed for a transition from said post-isolation configuration to said candidate network; TotalWeightedLoadbase is a weighted total load of said network; TotalWeightedLoad(idv) is a weighted total load of the candidate network.

5. The method of claim 4 wherein:

$$\mathrm{Total\ WeightedLoad} = \Sigma \mathrm{LoadinOOSAreas} + \mathrm{PenaltyFactor} * \Sigma \mathrm{LoadinBackFeedingAreas}$$

where LoadinOOSAreas is the load in the out-of-service areas of said network and LoadinBackFeedingAreas is the remaining load in the non-isolated or faulted portions of said network; the PaneltyFactor being greater than 1.

6. The method of claim 2 wherein:

$$Ivionr=Ivio(idv)/Iviomax$$

where Ivio(idv) is the number of current violations for a candidate network and Iviomax is the largest number of current violations for any chromosome in a generation.

7. The method of claim 1 wherein said step of creating initial chromosomes includes, for each said normally open tie switch, randomly selecting one of said list of actions.

8. The method of claim 1 wherein, for each said normally open tie switch, said corresponding normally closed switch includes normally closed switches upstream of said normally open tie switch and, if said normally open tie switch bounds one of said out-of-service areas, said corresponding normally closed switch also includes normally closed switches in that out-of-service area.

9. The method of claim 1 wherein said characters are ASCII characters.

10. The method of claim 4 wherein the initial population size and the new population size equals 4*N+1, where N=NoTieSwitchesbase/2 and where N is an integer.

11. The method of claim 1 wherein said step of using genetic manipulation to create new chromosomes for a new chromosome population further comprises:
directly copying a plurality of chromosomes from said initial population to the new population; and
performing crossovers and mutations on said plurality of chromosomes from said initial population to the new population.

12. The method of claim 1 wherein said step of using genetic manipulation to create new chromosomes of a new chromosome population further comprises:
adding the top N chromosomes from the previous generation to the new generation unchanged;
crossing-over the best candidate chromosome with the next N chromosomes to generate N new chromosomes;
mutating the next N chromosomes after the top N to create N new chromosomes in the new generation; and
if additional new chromosomes are required to fill said new generation, for each said normally open tie switch, randomly selecting one of said list of actions.

13. A method for determining a network topology to restore power to one or more out-of-service load areas in a power network after a fault has been isolated in the network, wherein said network comprises a plurality of normally closed switches and a plurality of normally open tie switches, at least one of said normally closed switches has opened to isolate said fault, the at least one normally closed switch that opened to isolate said fault and at least one of said normally open tie switches collectively create said out-of-service load area, and a network topology comprises open/closed switch states for said normally closed switches and said normally open tie switches, the method comprising:
i. defining a chromosome architecture for creating a plurality of unique chromosomes, each said chromosome being a string of characters, each said character corresponding to one of said normally open tie switches and representing one of a list of actions for said corresponding normally open tie switch, said list of actions including (1) said corresponding normally open tie switch remaining open, (2) closing said corresponding normally open tie switch, or (3) opening one of said normally closed switches that is identified by said character and closing said corresponding normally open tie switch;
ii. initializing a chromosome list;
iii. creating initial chromosomes for a first chromosome generation using said chromosome architecture, wherein each chromosome corresponds to a candidate network topology;
iv. applying a predetermined validity criteria to determine whether each created initial chromosome is valid;
v. adding to said chromosome list each created initial chromosome that is valid and not already in said chromosome list;
vi. determining for each chromosome in said first chromosome generation a fitness value for the corresponding candidate network topology using a fitness function;
vii. sorting said chromosomes by their corresponding fitness values and identifying the chromosome having the lowest fitness value as the best candidate chromosome;
viii. outputting the candidate network topology corresponding to said best candidate chromosome when said fitness value for said best candidate chromosome is below a predefined threshold fitness value;
ix. creating new chromosomes for a new chromosome generation when said fitness value for said best candidate chromosome is not below said threshold fitness value, and adding to said chromosome list each new chromosome in said new chromosome generation that is not already in said chromosome list;
x. determining for each new chromosome in said new chromosome generation a fitness value for the corresponding candidate network topology using said fitness function; and
xi. repeating steps vii-x until the fitness value for said best candidate chromosome is below said threshold fitness value or until a predetermined number of new chromosome generations have been created, whereupon the candidate network topology corresponding to said best candidate chromosome is output.

14. The method of claim 13 wherein said fitness function comprises:

$$\mathrm{fit}(idv)=w_{Sw}SwOp_{nr}(idv)+w_{Ivio}Ivio_{nr}(idv)+w_{P}P_{nr}(idv)$$

where idv is an index of a candidate network topology corresponding to a chromosome; and for the candidate network topology: Ivionr is a normalized number of back-path current violations in the candidate network topology; SwOpnr is the normalized switching operations for the candidate network topology; Pnr is the normalized total unserved load for the candidate network topology; and wIvio, wSw, wp are user definable weighting factors.

15. The method of claim 14 wherein:

$$SwOp_{nr}(idv)=\text{NoSwitchOperations}(idv)/\text{NoTieSwitches}_{base}$$

$$P_{nr}(idv)=(\text{TotalWeightedLoad}_{base}-\text{TotalWeightedLoad}(idv))/\text{TotalWeightedLoad}_{base}$$

where base identifies a base network topology corresponding to a network topology after said at least one of said normally closed switches has opened to isolate said fault and (idv) represents the candidate network topology; NoTieSwitchesbase is the total number of normally open tie switches in said network; NoSwitchOperations is the number of switch operations, excluding isolation switching operations, needed for a transition from said base network topology to said candidate network topology; TotalWeightedLoadbase is a weighted total load of said base network topology; Total WeightedLoad (idv) is a weighted total load of the candidate network topology.

16. The method of claim 15 wherein:

$$TotalWeightedLoad = \Sigma LoadinOOSAreas + PenaltyFactor * \Sigma LoadinBackFeedingAreas$$

where LoadinOOSAreas is the load in said out-of-service load areas of said network and LoadinBackFeedingAreas is the remaining load in the non-isolated or faulted portions of said network; the PanteltyFactor being greater than 1.

17. The method of claim 14 wherein:

$$Ivionr = Ivio(idv)/Iviomax$$

where Ivio(idv) is the number of current violations for a candidate network topology and Iviomax is the largest number of current violations for the candidate network topology corresponding to any chromosome in a generation.

18. The method of claim 13 wherein, for each said normally open tie switch, said normally closed switch identified by said character is upstream of said normally open tie switch and, if said normally open tie switch bounds one of said out-of-service areas, said normally closed switch identified by said character is also in that out-of-service area.

19. The method of claim 13 wherein said characters are ASCII characters and said ASCII characters representing said action of opening one of said normally closed switches that is identified by said character and closing said corresponding normally open tie switch have an ASCII value higher than 33.

20. The method of claim 15 wherein each of said first chromosome generation and said new chromosome generations have a population size equaling 4*N+1, where N=NoTieSwitchesbase/2 and where N is an integer.

21. The method of claim 13 wherein said step of creating new chromosomes for a new chromosome generation further comprises:
   directly copying a plurality of chromosomes from a previous chromosome generation to the new chromosome generation; and
   performing crossovers and mutations on said plurality of chromosomes from said previous chromosome generation to the new chromosome generation.

22. The method of claim 13 wherein said step of creating new chromosomes for a new chromosome generation further comprises:
   adding the top N chromosomes having the N lowest fitness values from the previous generation to the new generation unchanged;
   crossing-over the best candidate chromosome with the next N chromosomes from the previous generation to generate N new chromosomes;
   mutating the next N chromosomes after the top N chromosomes from the previous generation to create N new chromosomes in the new generation; and
   if additional new chromosomes are required to fill said new generation, randomly selecting one of said list of actions for each said normally open tie switch.

23. The method of claim 13 wherein said predetermined validity criteria indicates that any chromosome creating an energized loop within said network is not valid.

24. The method of claim 23 comprising applying said predetermined validity criteria to determine whether each created new chromosome is valid, and discarding each new chromosome determined to be not valid.

* * * * *